United States Patent
Johnston et al.

(10) Patent No.: US 6,435,135 B1
(45) Date of Patent: Aug. 20, 2002

(54) WOOD BASED PRODUCT FOR FORMING POULTRY BEDDING

(75) Inventors: Dean Johnston; Gary Johnston; Wayne Wiren, all of Princeton (CA)

(73) Assignee: Princeton Co-Generation Corporation (CA)

(*) Notice: Subject to any disclaimer, the term of this patent is extended or adjusted under 35 U.S.C. 154(b) by 49 days.

(21) Appl. No.: 09/640,302

(22) Filed: Aug. 16, 2000

(30) Foreign Application Priority Data

Aug. 16, 1999 (CA) .............................................. 2280426

(51) Int. Cl.[7] .............................................. A01K 1/015
(52) U.S. Cl. ....................... 119/171; 119/526
(58) Field of Search ................ 119/171, 172, 119/526

(56) References Cited

U.S. PATENT DOCUMENTS

| | | | |
|---|---|---|---|
| 3,256,857 A | * | 6/1966 | Karras .......................... 119/171 |
| 3,941,090 A | | 3/1976 | Fry |
| 4,311,115 A | | 1/1982 | Litzinger |
| 4,458,629 A | | 7/1984 | Gerber |
| 5,044,324 A | | 9/1991 | Morgan et al. ............... 119/171 |
| 5,271,355 A | * | 12/1993 | Billings ....................... 119/171 |
| 5,542,374 A | | 8/1996 | Palmer, Jr. |
| 5,927,049 A | * | 7/1999 | Simard .................... 119/171 X |
| 5,964,187 A | * | 10/1999 | Willis .......................... 119/171 |

FOREIGN PATENT DOCUMENTS

| | | | | |
|---|---|---|---|---|
| CA | 2047558 | | 4/1994 | |
| CA | 2120658 | | 10/1994 | |
| SU | 1774846 A3 | * | 11/1992 | .................. 119/172 |

* cited by examiner

Primary Examiner—Robert P. Swiatek
(74) Attorney, Agent, or Firm—Killworth, Gottman, Hagan & Schaeff, L.L.P.

(57) ABSTRACT

A wood based product comprises condensed natural wood fibres. The wood fibres have bulk density of about 20 lbs/ft$^3$ or greater at moisture content of about 15% by weight or less, and each particle of the wood fibres has a particle size of less than about 3/16 inch. By using such condensed wood fibres, the wood based product is capable of functioning as physical bedding for poultry that can absorb moisture and ammonia for a complete production cycle of commercial poultry operations.

35 Claims, 1 Drawing Sheet

WOOD BASED PRODUCT FOR FORMING POULTRY BEDDING

This invention relates to a wood based product, and more particularly, to a wood based product for use as poultry bedding.

BACKGROUND OF THE INVENTION

Traditionally, in order to form poultry bedding, commercial poultry operations utilize products that are available in each geographic area. For example, wood shavings, sawdust, hulls, straw and a combination of these materials are used.

Major problems involved in such bedding relate to moisture and ammonia.

Most bedding materials are placed in barns at high moisture. In order to attempt to dry bedding, heat is often turned on in a barn for days in advance of entering poultry into the barn. The need of pre-heating increases heating costs. However, even if the bedding is somewhat dried, once poultry start to use the bedding, the bedding becomes damp as it is challenged by poultry waste. When poultry use damp bedding, the feet of poultry become blistered, which inhibits mobility and thus inhibits growth of poultry. In broiler breeders, this also tends to hamper rooster performance, which lowers egg production. Dampness may also leads to joint problems, especially in turkeys, which also hurts growth. Dampness promotes decomposition of the bedding materials. Dampness also promotes "caking" of bedding materials to form hard clumps in the bedding. This often leads to blisters on the breasts of poultry as poultry rub their breasts on the bedding as they stand from lying down positions. The wet bedding then promotes infection, thus down grading poultry final products. Dampness may also cause respiratory problems in poultry, which also down grade the quality of poultry final products. Furthermore, dampness contributes to high activity of flies and black wing beetles, which may cause disease in poultry. Especially, black wing beetles eat feed and bite the underside of poultry, which leads to open sores ripe for infection.

As the bedding materials compost due to moisture, additional heat is generated in the barn. Especially in summer months, such heat must be expelled out of the barn by fans. This also increases electricity costs.

Further, levels of ammonia in the barn increase as the grow progresses, to the point of burning eyes and throat of anyone entering barn. Such high levels of ammonia cause blindness in poultry, which limits mobility to feeders and inhibits growth. Also, these high levels of ammonia affect the overall health of poultry and promotes lung disease.

Such an environment with high humidity and high ammonia levels affects overall health of poultry and increases the mortality rates in poultry.

Some additives have been proposed to attempt to deal with some of these problems. Those additives include insecticides and clay additives to control ammonia. However, they are additives to existing bedding. The other disadvantages of existing bedding still remain. Accordingly, a different material is needed to make bedding. In particular, the additives deal only with ammonia and do not provide a remedy for the moisture related problems. Also, those additives usually last only for a few weeks.

In the commercial poultry industry, a production cycle is generally longer than a few weeks. For example, turkey growers traditionally follow a 16 week growth cycle after birds are received from hatchery. For chicken growers, broilers typically follow a 6 week growth cycle or a 37 to 42 day growth cycle from the receipt of chicks to the transmission to processing plants. Broiler breeders produce eggs for hatcheries to incubate, then distribute chicks to broiler operations. Each flock typically begins egg production in 20 weeks, and produces eggs for up to 40 weeks.

Accordingly, those additives would not last long enough for a complete production cycle. Also, as indicated above, the additives do not cause lowering of moisture in the growth environment.

It is known to use various sizes of whole wood pellets or crumbled wood pellets as kitty litter or other household pet bedding. Also, it is known to use wood pellets as bedding for horses. Wood pellets are capable of controlling odours. However, they are not suitable for use as bedding for poultry. Expelling ammonia and associated nitrates to the atmosphere is an environmental concern. Also, ammonia levels are a major concern relating to worker health.

U.S. Pat. No. 5,044,324 issued on Sep. 3, 1991 to Morgan discloses use of wood fibre crumbles as an animal litter. The crumbles are made by grinding wood pellets made by pelletizing in a conventional animal feed pelletizer. By grinding pellets, wood fibre dust is generated, which Morgan suggests should be vacuumed away from the crumbles. Morgan does not address any of the specific problems encountered in poultry operations or suggest any solution to such specific problems.

Therefore, there is a need to provide bedding material which is suitable for use as bedding for poultry and which is capable of absorbing moisture and odours for a period long enough to be used in a full production cycle in commercial poultry operations.

SUMMARY OF THE INVENTION

The present invention provides a wood based product which comprises wood fibres having a specific particle size, dryness and density. By using such condensed wood fibres, the wood based product is capable of functioning as physical bedding for poultry providing effective absorption of moisture and ammonia for a complete production cycle for commercial poultry operations.

In accordance with an aspect of the present invention, there is provided a wood based product for use as bedding for poultry. The wood based product comprises condensed natural wood fibres having a bulk density of about 20 lbs/ft$^3$ or greater at moisture content of about 15% by weight or less, and each particle of the wood fibres having a particle size of less than about 3/16 of an inch.

In accordance with another aspect of the present invention, there is provided a method of providing bedding for poultry, the method comprising the steps of preparing a wood based product comprising condensed natural wood fibres having bulk density of about 20 lbs/ft$^3$ or greater at moisture content of about 15% by weight or less, and each particle of the wood fibres having a particle size of less than about 3/16 of an inch, and forming bedding for poultry using the wood based product.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
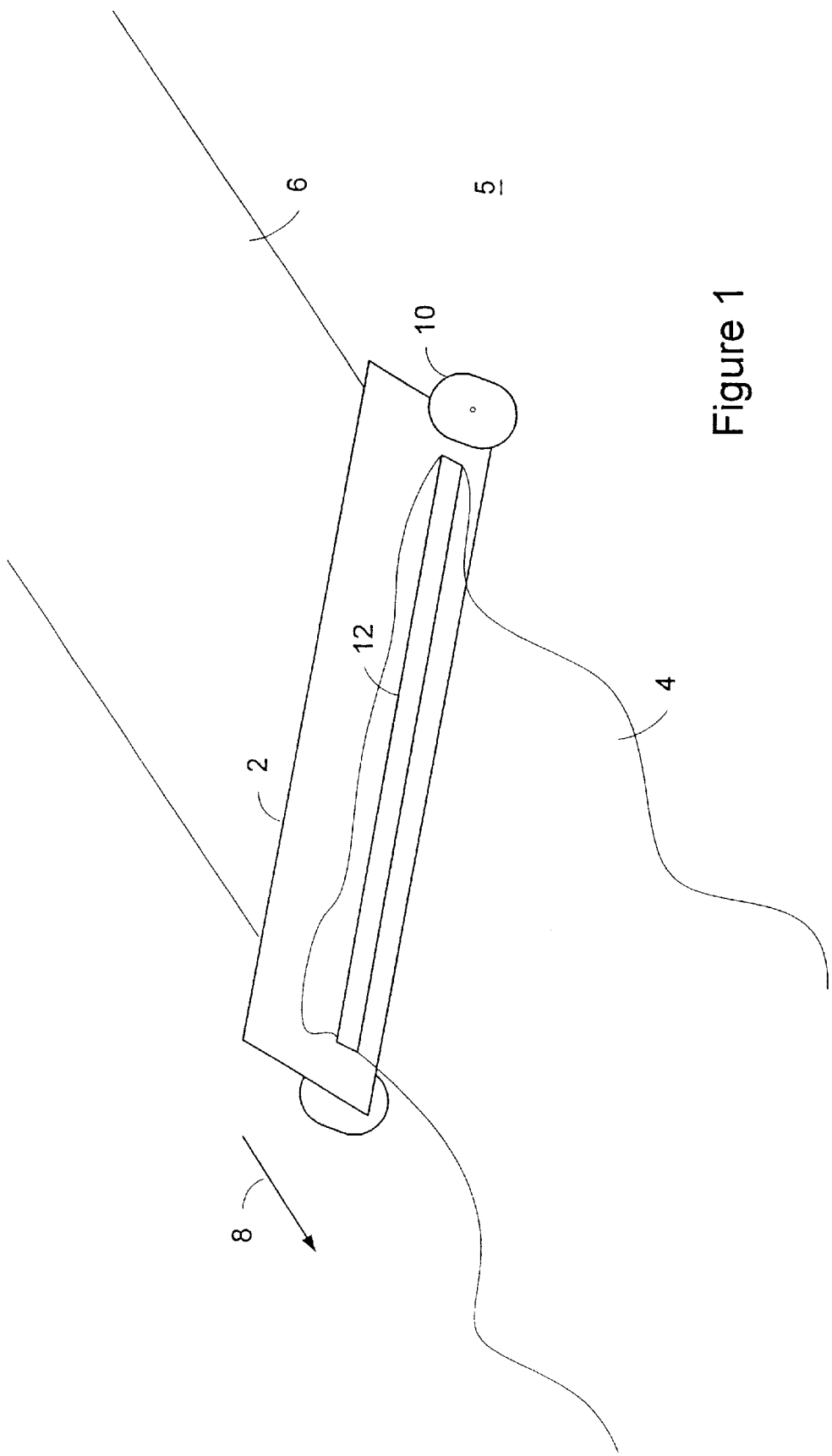
FIG. 1 is an embodiment of a spreading device used to lay out a wood based product in accordance with the present invention.

The present invention provides a wood based product for forming bedding for poultry. The wood based product comprises condensed natural wood fibres.

The condensed wood fibres are made from natural wood materials. The wood materials may be of any hard woods or soft woods, and the bark of those woods. Examples of suitable woods include Ponderosa, Lodgepole Pine, Spruce and White/Alpine Fir. For example, a mixture of Ponderosa and Lodgepole Pine is suitably used together with a mixture of Spruce and White/Alpine Fir. In this case, the ratio of the mixture of Ponderosa and Lodgepole Pine is preferably approximately 85% by weight.

Because the wood based product uses natural wood material, it is capable of absorbing odours associated with poultry waste, and controlling arnmonia to levels to prevent harm.

Each particle of the condensed wood fibres has a particle size of less than 3/16 of an inch. Preferably, the condensed wood fibres are small enough to pass through a 3/16 inch screen. Each particle may take any shape as long as the largest dimension of the particle is less than 3/16 of an inch.

By having such small particle sizes, the condensed wood fibres resemble, in appearance, existing bedding material used in conventional commercial poultry operations, e.g., sawdust. Thus, poultry would not be lured to eat the condensed wood fibres. In the case where a bird eats a particle, the risk of killing the bird would be reduced as it would be a smaller amount of the condensed material in its stomach, and it would not swell to an extent to be harmful to the bird, compared to larger particles. Therefore, the condensed wood fibres can be suitably used as bedding for poultry.

Furthermore, the condensed natural wood fibres have a bulk density of 20 lbs/ft$^3$ or greater at moisture content of 15% by weight or less. The moisture content is preferably less than 6% by weight. The bulk density is preferably approximately 27 to 33 lbs/ft$^3$.

The condensed wood fibres resemble dried sawdust in appearance. However, they are about 3½ times the bulk density compared to dried sawdust. For example, dried sawdust generally has a bulk density of approximately 11 lbs/ft$^3$ at a moisture content of approximately 8% by weight. By contrast, the condensed wood fibres made from sawdust has a bulk density of approximately 27 to 33 lbs/ft$^3$ at a moisture content of approximately 4 to 5%. The desired values of moisture content and bulk density of the condensed wood fibres may vary depending on the environment. Especially, these values may vary depending on moisture levels and temperatures in manufacturing and shipping processes of the wood based product and in a poultry barn where the wood based product is used.

Because of such high bulk density and low moisture content, the condensed wood fibres are capable of efficiently absorbing moisture and ammonia. If they fully absorb water, the wood fibres expand up to 2½ to 3 times the volume of the dry state. The condensed wood fibres are capable of absorbing moisture and ammonia produced by poultry for a complete production cycle of commercial poultry operations.

The wood based product may also contain condensed wood fibres having a particle size of about 3/16 of an inch or larger. Such larger wood fibres may constitute up to about 99% by weight relative to the wood fibres having a particle size of less than about 3/16 of an inch and still be effective in some circumstances.

The wood based product may contain a different type of wood fibre, such as sawdust, shavings and bark. Such wood fibre may be of any species. The wood based product may also contain other organic cellulose fibre and/or clay absorbent.

Combinations and amounts of such additional materials in the wood based product may vary provided the desired ammonia and moisture absorbing effects are maintained.

The wood based product comprising the condensed wood fibres may combine the features of physical bedding, and humidity and ammonia suppression in one product.

The wood based product may form bedding by itself. A layer of the wood based product may be formed on a bedding base, e.g., a barn floor or a shelf. In that case, it is preferable to form the layer to have a thickness of less than about one inch. The thickness may be determined depending on the type of poultry. For example, for broilers, a layer of about 3/8–½ of an inch in depth or about 0.34 Ton/1000 sq.ft. barn space is suitably used.

The wood based product may be added to other bedding material, It may be added as a layer of the wood based product on the top of a layer of other bedding material.

When providing a layer of the wood based product on a bedding base or on other bedding material, it is preferable to lay out the wood based product.

The laying out of the wood based product is suitably carried out by using a spreading device, as shown in FIG. 1. In this embodiment, as a spreading device, a spreading blade 2 is used. The wood based product 4 is inserted into a barn by using, e.g., a conventional grain/feed trailer with auger. The wood based product 4 is then distributed evenly using a spreading blade 2 moved by a vehicle (not shown). The spreading blade 4 may be moved to push or pull the wood based product 4 across a bedding base 5. The blade 2 allows a controllable level of a layer 6 of the wood based product 4 to remain H"laid-out" behind the blade 2 as the vehicle moves the blade 2 as shown by an arrow 8 in FIG. 1. It is preferable that the blade 2 rides along runners 10 across the bedding base, and has a slot 12 cut along the bottom of the blade 2. Thus, the wood based product 4 may escape through the slot 12 as the vehicle moves the blade 2 across the barn floor. The slot 12 may be approximately ½ inch wide. The depth or thickness of the layer 6 of the wood based product 4 may be adjusted by adjusting height on the slot 12. This may be done by tilting the angle of the spreading blade 2 relative to the bedding base 5.

Since in the preferred embodiment the condensed wood fibres have a particle size of less than 3/16 inches, it is possible to form a thin layer of the wood based product. It is also possible to accurately adjust the amount of the wood based product distributed on a bedding base. Furthermore, as such small particles of wood fibres have small airspaces between particles, a layer of the wood based product provides a high insulation level between the floor and birds. Also, using small particles allow cost effective formation of a layer of a given depth, compared to larger particles.

By using the wood based product as bedding for poultry, ammonia levels in the barn stay low or are absent for a complete production cycle. Thus, blindness in poultry due to high levels of ammonia can be avoided. This results in better mobility, and accordingly in better growth of poultry, compared to conventional poultry bedding. Also, as ammonia is absorbed in the wood based product, no nitrogen is released to the air.

The bedding formed from the wood based product is initially dry and stays dry for a complete production cycle. The bedding absorbs all or almost all moisture out of poultry waste. The dry bedding provides better feet quality and less joint strain. Thus, poultry have better mobility and better feed/water access, which increases growth rates. There is no moisture to attract flies. Black wing beetles almost never infest the bedding. The dry environment provides less stress on the respiratory system of the poultry. The bedding stays soft and less abrasive on breasts of poultry because no or only a little caking of the fibres occurs in the bedding. This lowers the likelihood of infection from open wounds.

Therefore, the bedding formed using the wood based product of the present invention provides a less stressful environment for poultry. This leads to superior overall health and appearance of poultry, and increases the quality of processed poultry products. The healthy environments increase growth rates and lowers mortality rates.

Furthermore, as the wood based product is dry, the bedding is dry when it is formed in a barn. This eliminates need for extended pre-heating of the barn. As the bedding stays dry, no decomposition of the wood based product occurs in the bedding and no unwanted heat related to decomposition is added to the barn air. This decreases the need to circulate air in the barn. Also, as ammonia levels stay low, there is less need to expel ammonia out of the barn by fan. Thus, the use of the wood based product as poultry bedding lowers electrical costs, compared to conventional poultry bedding.

Further, eliminating the need of pre-heating increases production cycles in a barn.

Consequently, by having the specific particle size in conjunction with the high dryness and highly condensed fibre as described above, the wood based product comprising the condensed wood fibres is suitable for the use as bedding for poultry As the wood based product is capable of functioning as physical bedding, there is no need to combine it with other product as it was necessary in the case of conventional additives.

The wood based product of the present invention may be suitably made by adjusting the moisture content of natural wood material, condensing the natural wood material, and obtaining condensed wood fibres having a particle size less than $3/16$ of an inch. The condensation of natural wood material may be suitably carried out in a pelletizing process of wood material.

Natural wood material may be condensed by applying a pressure of about 20–30,000 PSI.

The wood based product may also be used as a cultivation bed after it is used as poultry bedding.

While particular embodiments of the present invention have been shown and described, changes and modifications may be made to such embodiments without departing from the true scope of the invention.

What is claimed is:

1. A wood based product for use as bedding for poultry, the wood based product comprising condensed natural wood fibres formed by condensing natural wood material by applying a pressure to have a bulk density of about 20 lbs/ft$^3$ or greater at a moisture content of about 15% by weight or less, and each particle of the wood fibres having a particle size of less than about $3/16$ of an inch.

2. The wood based product as claimed in claim 1, wherein the wood fibres have a bulk density of about 27 to 33 lbs/ft$^3$.

3. The wood based product as claimed in claim 1, wherein the wood fibres have a moisture content of about 6% by weight or less.

4. The wood based product as claimed in claim 1 wherein the wood based product is a blend of the condensed wood fibres and at least one of other wood fibres, other organic cellulose fibres and a clay absorbent.

5. A method of using a wood based product for bedding for poultry, the method comprising:

providing a wood based product comprises condensed natural wood fibres formed by condensing natural wood material by applying a pressure to have a bulk density of about 20 lbs/ft$^3$ or greater at a moisture content of about 15% by weight or less, and each particle of the wood fibres having a particle size of less than about $3/16$ of an inch; and forming bedding for poultry using the wood based product.

6. The method of using a wood based product as claimed in claim 5, wherein the method further comprises the step of forming bedding for poultry using the wood based product.

7. The method of using a wood based product as claimed in claim 6, wherein the step of forming bedding comprises the step of forming a layer of the wood based product, the layer having a thickness of less than about one inch.

8. The method of using a wood based product as claimed in claim 7, wherein the step of forming a layer comprising the step of laying out the wood based product.

9. The method of using a wood based product as claimed in claim 5 wherein the step of using a wood based product comprises the step of using the wood based product having a bulk density of about 27 to 33 lbs/ft$^3$.

10. The method of using a wood based product as claimed in claim 5, wherein the step of using a wood based product comprises the step of using the wood based product having moisture content of about 6% by weight or less.

11. The method of using a wood based product as claimed in claim 5, wherein the wood based product is a blend of the condensed wood fibres and at least one of other wood fibres, other organic cellulose fibres and a clay absorbent.

12. A method of providing bedding for poultry, the method comprising the steps of:

preparing a wood based product comprising condensed natural wood fibres formed by condensing natural wood material by applying a pressure to have a bulk density of about 20 lbs/ft$^3$ or greater at a moisture content of about 15% by weight or less, and each particle of the wood fibres having a particle size of less than about $3/16$ of an inch; and forming bedding for poultry using the wood based product.

13. The method of providing bedding as claimed in claim 12, wherein the step of forming bedding comprises the step of providing a layer of the wood based product on a bedding base, the layer having a thickness of less than about one inch.

14. The method of providing bedding as claimed in claim 12, wherein the step of forming bedding comprises the step of providing a layer of the wood based product on a layer of other bedding material.

15. The method of providing bedding as claimed in claim 12, wherein the step of providing a layer of the wood based product comprises the step of laying out the wood based product.

16. The method of providing bedding as claimed in claim 12, wherein the step of laying out the wood based product comprises the steps of:

distributing evenly the wood based product; and adjusting the level of the distribution of the wood based product.

17. The method of providing bedding as claimed in claim 12, wherein the wood based product is prepared to have a bulk density of about 27 to 33 lbs/ft$^3$.

18. The method of providing bedding as claimed in claim 12, wherein the wood based product is prepared to have a moisture content of about 6% by weight or less.

19. The method of providing bedding as claimed in claim 12, wherein the wood based product is a blend of the condensed wood fibres and at least one of other wood fibres, other organic cellulose fibres and a day absorbent.

20. A method of lowering ammonia and moisture levels in a poultry barn, the method comprising the steps of:

preparing a wood based product comprising condensed natural wood fibres formed by condensing natural wood material by applying a pressure to have a bulk density of about 20 lbs/ft$^3$ or greater at a moisture content of about 15% by weight or less, and each particle of the wood fibres having a particle size of less than about 3/16 of an inch; and forming bedding for poultry in the poultry barn using the wood based product.

21. The method of lowering ammonia and moisture levels as claimed in claim 20, wherein the step of forming bedding comprises the step of providing a layer of the wood based product on a bedding base, the layer having a thickness of less than about one inch.

22. The method of lowering ammonia and moisture levels as claimed in claim 20, wherein the step of forming bedding comprises the step of providing a layer of the wood based product on a layer of other bedding material.

23. The method of lowering ammonia and moisture levels as claimed in claim 20, wherein the step of providing a layer of the wood based product comprises the step of laying out the wood based product.

24. The method of lowering ammonia and moisture levels as claimed in claim 20, wherein the step of laying out the wood based product comprises the steps of distributing evenly the wood based product and adjusting the level of the distribution of the wood based product.

25. The method of lowering ammonia and moisture levels as claimed in claim 20, wherein the wood based product is prepared to have a bulk density of about 27 to 33 lbs/ft$^3$.

26. The method of lowering ammonia and moisture levels as claimed in claim 20, wherein the wood based product is prepared to have a moisture content of about 6% by weight or less.

27. The method of lowering ammonia and moisture levels as claimed in claim 20, wherein the wood based product is a blend of the condensed wood fibres and at least one of other wood fibres, other organic cellulose fibres and a clay absorbent.

28. A method of making a wood based product for forming bedding for poultry, the method comprising the steps of:

obtaining natural wood material;

adjusting moisture content of the natural wood material;

condensing the natural wood material by applying a pressure to have a bulk density of about 20 lbs/ft$^3$ or greater; and obtaining the wood based product comprising condensed wood fibres having a particle size of less than about 3/16 of an inch.

29. The method of making a wood based product as claimed in claim 28, wherein the moisture content of the natural wood material is adjusted so was to provide the wood based product having a moisture content of about 15% by weight or less.

30. The method of making a wood based product as claimed in claim 29, wherein the moisture content of the natural wood material is adjusted so as to provide a wood based product having a moisture content of about 6% by weight or less.

31. The method of making a wood based product as claimed in claim 28, wherein the natural wood material is condensed so as to provide a wood based product having a bulk density of about 27 to 33 lbs/ft$^3$.

32. The method of making a wood based product as claimed in claim 28, wherein the natural wood material is condensed by application of a pressure of about 20 to 30,000 PSI onto the natural wood material.

33. The method of making a wood based product as claimed in claim 28, wherein the natural wood material is condensed by pelletizing the natural wood material.

34. The method of making a wood based product as claimed in claim 28, wherein each particle of the wood fibres has a particle size of less than about 3/16 of an inch.

35. The method of making a wood based product as claimed in claim 28, wherein the natural wood material is condensed at a pressure of from about 20,000 to 30,000 PSI.

\* \* \* \* \*

UNITED STATES PATENT AND TRADEMARK OFFICE
CERTIFICATE OF CORRECTION

PATENT NO.   : 6,435,135 B1
DATED        : August 20, 2002
INVENTOR(S)  : Johnston et al.

It is certified that error appears in the above-identified patent and that said Letters Patent is hereby corrected as shown below:

Column 7,
Line 10, "and a day absorbent." should be -- and a clay absorbent. --
Line 38, "the steps of" should be -- the steps of: --

Column 8,
Line 21, "adjusted so was" should be -- adjusted so as --

Signed and Sealed this

Twenty-fifth Day of February, 2003

JAMES E. ROGAN
*Director of the United States Patent and Trademark Office*